United States Patent
Finlay et al.

(10) Patent No.: US 7,111,025 B2
(45) Date of Patent: Sep. 19, 2006

(54) INFORMATION RETRIEVAL SYSTEM AND METHOD USING INDEX ANDING FOR IMPROVING PERFORMANCE

(75) Inventors: Ian Richard Finlay, Uxbridge (CA); Guy Maring Lohman, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 501 days.

(21) Appl. No.: 10/427,345

(22) Filed: Apr. 30, 2003

(65) Prior Publication Data

US 2004/0220904 A1    Nov. 4, 2004

(51) Int. Cl.
G06F 17/30 (2006.01)

(52) U.S. Cl. .................... 707/203; 707/101
(58) Field of Classification Search .............. 707/1–10, 707/100–104.1, 200–205
See application file for complete search history.

(56) References Cited

U.S. PATENT DOCUMENTS

| | | | | |
|---|---|---|---|---|
| 5,241,648 | A | * | 8/1993 | Cheng et al. .................... 707/7 |
| 5,548,755 | A | * | 8/1996 | Leung et al. ................... 707/2 |
| 5,848,408 | A | | 12/1998 | Jakobsson et al. ............. 707/3 |
| 5,937,401 | A | | 8/1999 | Hillegas ......................... 707/2 |
| 5,963,933 | A | | 10/1999 | Cheng et al. ................... 707/2 |
| 5,987,453 | A | | 11/1999 | Krishna et al. ................ 707/4 |
| 6,105,020 | A | | 8/2000 | Lindsay et al. ................ 707/2 |
| 6,253,197 | B1 | | 6/2001 | Lindsay et al. ................ 707/3 |
| 6,272,487 | B1 | | 8/2001 | Beavin et al. .................. 707/2 |
| 6,341,281 | B1 | | 1/2002 | MacNicol et al. ............. 707/3 |
| 6,345,266 | B1 | | 2/2002 | Ganguly et al. ............... 707/1 |
| 6,385,603 | B1 | | 5/2002 | Chen et al. ..................... 707/3 |
| 6,397,204 | B1 | | 5/2002 | Liu et al. ........................ 707/2 |
| 6,493,701 | B1 | * | 12/2002 | Ponnekanti .................... 707/2 |
| 2002/0069193 | A1 | | 6/2002 | Beavin et al. .................. 707/2 |
| 2002/0078015 | A1 | | 6/2002 | Ponnekanti .................... 707/1 |

OTHER PUBLICATIONS

Robert Marek & Erhard Rahm, TID Hash Joins, Nov. 1994.*
"Space and Time Efficient Evaluation of Indexable Conjunctive Predicates," IBM Technical Disclosure Bulletin, vol. 30, No. 3, pp. 1132-1133, Aug. 1987.
J. Cheng, et al., "An Efficient Hybrid Join Algorithm:A DB2 Prototype," Proceedings Seventh International Conference on Data Engineering, Apr. 8-12, 1991, Kobe, Japan.

* cited by examiner

Primary Examiner—Mohammad Ali
(74) Attorney, Agent, or Firm—Samuel A. Kassatly

(57) ABSTRACT

An information retrieval system is adapted to process a query having an associated plan that includes applying predicates comprising local predicates and a join predicate, to at least two tables. Index ANDing is used to construct a filter for filtering a first of the tables in accordance with the local predicates. The join predicate is applied to the tables for determining row identifiers of rows satisfying the join predicate. The row identifiers are used to probe the filter for determining whether the rows satisfying the join predicate also satisfy the local predicates. The rows that satisfy both the join and local predicates are fetched and the join predicate is completed. Results of the join predicate are then returned.

27 Claims, 3 Drawing Sheets

SELECT * FROM T1, T2
WHERE T1.C$_1$=T2.D$_1$ AND T2.D$_2$ =7 AND T2.D$_3$=9         102

| Table T1 | | | |
|---|---|---|---|
| C$_1$ | C$_2$ | C$_3$ | C$_4$ |
| R1 7 | 5 | 19 | 1 |
| R2 3 | 28 | 13 | 2 |
| R3 7 | 4 | 8 | 11 |
| R4 8 | 14 | 6 | 9 |
| R5 6 | 8 | 1 | 8 |
| R6 22 | 3 | 17 | 7 |

| Table T2 | | | | |
|---|---|---|---|---|
| RID | D$_1$ | D$_2$ | D$_3$ | D$_4$ |
| P1 1 | 7 | 8 | 9 | 3 |
| P2 2 | 8 | 7 | 9 | 24 |
| P3 3 | 7 | 13 | 2 | 2 |
| P4 4 | 6 | 21 | 5 | 8 |
| P5 5 | 3 | 14 | 11 | 15 |
| P6 6 | 3 | 7 | 9 | 6 |
| P7 7 | 7 | 7 | 9 | 1 |
| P8 8 | 22 | 22 | 9 | 17 |

(Prior Art)
Figure 1a

| Index T2.idx.D1 | |
|---|---|
| # | RID |
| 3 | 5, 6 |
| 6 | 4 |
| 7 | 1, 3, 7 |
| 8 | 2 |
| 22 | 8 |

| Index T2.idx.D2 | |
|---|---|
| # | RID |
| 7 | 2, 5, 7 |
| 8 | 1 |
| 13 | 3 |
| 14 | 6 |
| 21 | 4 |
| 22 | 8 |

| Index T2.idx.D3 | |
|---|---|
| # | RID |
| 2 | 3 |
| 5 | 4 |
| 9 | 1, 2, 5, 7, 8 |
| 11 | 6 |

(Prior Art)
Figure 1b

INFORMATION RETRIEVAL SYSTEM AND METHOD USING INDEX ANDING FOR IMPROVING PERFORMANCE

FIELD OF THE INVENTION

The present invention relates to information retrieval systems in general. In particular, the present invention relates to information retrieval systems using index ANDing (IXA) for improving performance.

BACKGROUND OF THE INVENTION

A common form of information retrieval system for managing computerized records contained in a database is a relational database management system. Between an actual database (that is, data stored for use by a computer) and users of the contents of that database is a software layer known as the relational database management system (RDBMS or DBMS). The DBMS is responsible for handling all requests for access to the database and shielding the users from the details of any specific hardware and/or software implementation. Using relational techniques, the DBMS stores, manipulates and retrieves data in table form. Typically, these relationships are defined by a set of columns and a set of rows. The columns are also referred to as attributes, or data types. The rows are also referred to as records or tuples, of data.

A standard language for dealing with DBMSs is the Structured Query Language (SQL). SQL comprises both data definition operations and data manipulation operations. To maintain data independence, a set of SQL commands, referred to as a query, provides the DBMS with instructions to perform. However, the query does not describe directions for performing the instructions. Thus, the DBMS comprises a query processor for generating various query plans of execution and choosing a preferred plan. Due to the high-level nature of relational expressions and a variety of implementation techniques, automatic query optimization is possible and often necessary to ensure efficient query processing.

In accordance with well-known query translation processes, an SQL query is processed in stages. The initial stage casts the source query into an internal form such as the Query Graph Model (QGM) following the preliminary steps of lexing, parsing and semantic checking. The goal of the QGM is to provide a more powerful and conceptually more manageable representation of queries to reduce the complexity of query compilation and optimization. The internal QGM is a data structure for providing the semantic relationships of the query for use by query translator and optimizer components for rewriting the query in a canonical form. In a next phase, a plan optimizer produces a query execution plan such as by generating alternate plans and choosing a best plan based on estimated execution costs. A plan refinement stage may be employed to refine the optimum execution plan in accordance with run-time requirements.

Accessing a table of data for carrying out a query typically requires transferring all or part of the table to random access memory (RAM) of the computer. When information is needed from a plurality of tables, the tables may be joined by the DBMS. Join operations, referred to hereafter as joins, allow information to be obtained across tables in a meaningful way.

One such join is a nested loop join (NLJN). The NLJN selects one table as an outer table and the other as the inner table. When executing a nested-loop join, the outer table is scanned row by row. For each row in the outer table, the inner table is scanned looking for matching rows. A NLJN is efficient if one of the tables is small, or has been filtered such that it has only a few qualifying rows, and the other table has an index on the column that joins the tables. Typically, the smaller table is selected as the outer table because it is the fastest method of executing the NLJN.

FIG. 1a illustrates an exemplary first table T1 and a second table T2 respectively. The first table T1 comprises four (4) columns C1, C2, C3, and C4 and six (6) rows, R1, R2, R3, R4, R5, and R6. Similarly, the second table T2 comprises four (4) columns D1, D2, D3, and D4 and eight (8) rows, P1, P2, P3, P4, P5, P6, P7, and P8. A query 102 requires combining the rows of tables T1 and T2 as follows:

Select * from T1, T2 where T1.C1=T2.D1 and
T2.D2=7 and T2.D3=9     (1)

FIG. 1b illustrates exemplary table indices for the second table T2. A first index T2.idx.D1 represents the second table T2 indexed by column D1. A second index T2.idx.D2 represents the second table T2 indexed by column D2. A third index T2.idx.D3 represents the second table T2 indexed by column D3. Indices are often provided for facilitating access to a table in a predetermined order. Each index comprises a sorted column and a row identifier (RID) for identifying rows having a value indicated by the sorted column. In the present example, table T1 is small and table T2 has an index on the join column D1. Thus, table T1 is selected as the outer table and table T2 is selected as the inner table.

FIG. 1c illustrates an exemplary output table TO of the NLJN for the tables shown in FIG. 1a. For the NLJN, table T1 is selected as the outer and table T2 is selected as the inner table. Thus, for each row R1, R2, R3, R4, R5, R6 in table T1, every row P1, P2, P3, P4, P5, P6, P7, P8 in table T2 is scanned for a match on C1 and D1 respectively. Thus, for example, the value of C1 for the row R1 of table T1 is a '7'. Table T2 is scanned for determining which rows have a value of '7' in column D1. As a result of the scan, rows P1, P3, and P7 are returned. Each of these rows P1, P3, P7 are evaluated for determining whether they satisfy the predicate 'T2.D2=7 and T2.D3=9'. Only the row P7 satisfies the predicate, and thus it is joined with row R1 of table T1 and returned as an output as illustrated by row S1 of the output table TO.

However, evaluating the predicates for each join outer is both impractical and expensive. This is especially true since most database tables can be very large and processing such tables can be expensive in terms of computer resources. Therefore, it is important that techniques for joining tables be as efficient as possible. Accordingly, a solution that addresses, at least in part, this and other shortcomings is desired. The need for such a solution has heretofore remained unsatisfied.

SUMMARY OF THE INVENTION

The present invention satisfies this need, and presents a system, a computer program product, and an associated method (collectively referred to herein as "the system" or "the present system") for an information retrieval system using index ANDing to improve performance in a database system. It is an advantage of the present system that considerable performs gains can be realized over the prior art by avoiding excessive fetching. In accordance with an aspect of the present system there is provided, for an information retrieval system adapted to process a query having an associated plan. The associated plan comprises applying predicates, comprising local predicates and a join predicate, to at least two tables, a method of applying the predicates, the method comprising using index ANDing to construct a filter for filtering a first of the tables in accordance with the local predicates; applying the join predicate to the tables for determining row identifiers of rows satisfying the join predicate; using the row identifiers to probe the filter for determining whether the rows satisfying the join predicate also satisfy the local predicates; fetching the rows that satisfy both the join and local predicates; completing the join predicate; and returning results of the join predicate.

In accordance with another aspect of the present system, there is provided an information retrieval system adapted to process a query having an associated plan, the information retrieval system for applying the predicates, the information retrieval system comprising means for using index ANDing to construct a filter for filtering a first of the tables in accordance with the local predicates; means for applying the join predicate to the tables for determining row identifiers of rows satisfying the join predicate; means for using the row identifiers to probe the filter for determining whether the rows satisfying the join predicate also satisfy the local predicates; means for fetching the rows that satisfy both the join and local predicates; means for completing the join predicate; and means for returning results of the join predicate.

In accordance with yet another aspect of the present system, there is provided a computer program product having a computer readable medium tangibly embodying computer executable code for directing an information retrieval system to apply predicates, the information retrieval system adapted to process a query having an associated plan, the associated plan comprises applying predicates, comprising local predicates and a join predicate, to at least two tables, the computer program product comprising code for using index ANDing to construct a filter for filtering a first of the tables in accordance with the local predicates; code for applying the join predicate to the tables for determining row identifiers of rows satisfying the join predicate; code for using the row identifiers to probe the filter for determining whether the rows satisfying the join predicate also satisfy the local predicates; code for fetching the rows that satisfy both the join and local predicates; code for completing the join predicate; and code for returning results of the join predicate.

In accordance with yet another aspect of the present system, there is provided an article comprising a computer readable modulated carrier signal being usable over a network, and comprising means embedded in the computer readable modulated carrier signal for directing an information retrieval system to apply predicates, the information retrieval system adapted to process a query having an associated plan, the associated plan comprises applying predicates, comprising local predicates and a join predicate, to at least two tables, the computer program product comprising means for using index ANDing to construct a filter for filtering a first of the tables in accordance with the local predicates; means for applying the join predicate to the tables for determining row identifiers of rows satisfying the join predicate; means for using the row identifiers to probe the filter for determining whether the rows satisfying the join predicate also satisfy the local predicates; means for fetching the rows that satisfy both the join and local predicates; means for completing the join predicate; and means for returning results of the join predicate.

In accordance with yet another aspect of the system, there is provided, for an information retrieval system adapted to process a query having an associated plan that applies local predicates to at least two tables, a method of applying the predicates, comprising constructing a filter for filtering a first of the tables in accordance with the local predicates.

In accordance with yet another aspect of the system, there is provided an information retrieval system adapted to process a query having an associated plan that applies local predicates to at least two tables, the information retrieval system for applying the predicates, comprising means for constructing a filter for filtering a first of the tables in accordance with the local predicates.

In accordance with yet another aspect of the system, there is provided a computer program product comprising a computer readable medium tangibly embodying computer executable code for directing an information retrieval system adapted to process a query having an associated plan that applies local predicates to at least two tables, the information retrieval system directed to apply the predicates, the computer program product comprising code for constructing a filter for filtering a first of the tables in accordance with the local predicates.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 1a is a set of tables illustrating a query and two exemplary database tables;

FIG. 1b is a set of tables illustrating three indices for one of the tables shown in FIG. 1a;

FIG. 1c is a table illustrating a table representing a nested loop join of the tables shown in FIG. 1a;

FIG. 2 is a schematic illustration of an exemplary operating environment in which an information retrieval system and method using index ANDing of the present invention can be used;

DETAILED DESCRIPTION OF PREFERRED EMBODIMENT

The following detailed description of the embodiments of the present invention does not limit the implementation of the invention to any particular computer programming language. The present invention may be implemented in any computer programming language provided that the Operating System (OS) provides the facilities that may support the requirements of the present invention. An embodiment is implemented in the C or C++ computer programming language (or other computer programming languages in conjunction with C/C++). Any limitations presented would be a result of a particular type of operating system or computer programming language and would not be a limitation of the present invention.

Figures 1C, 2:
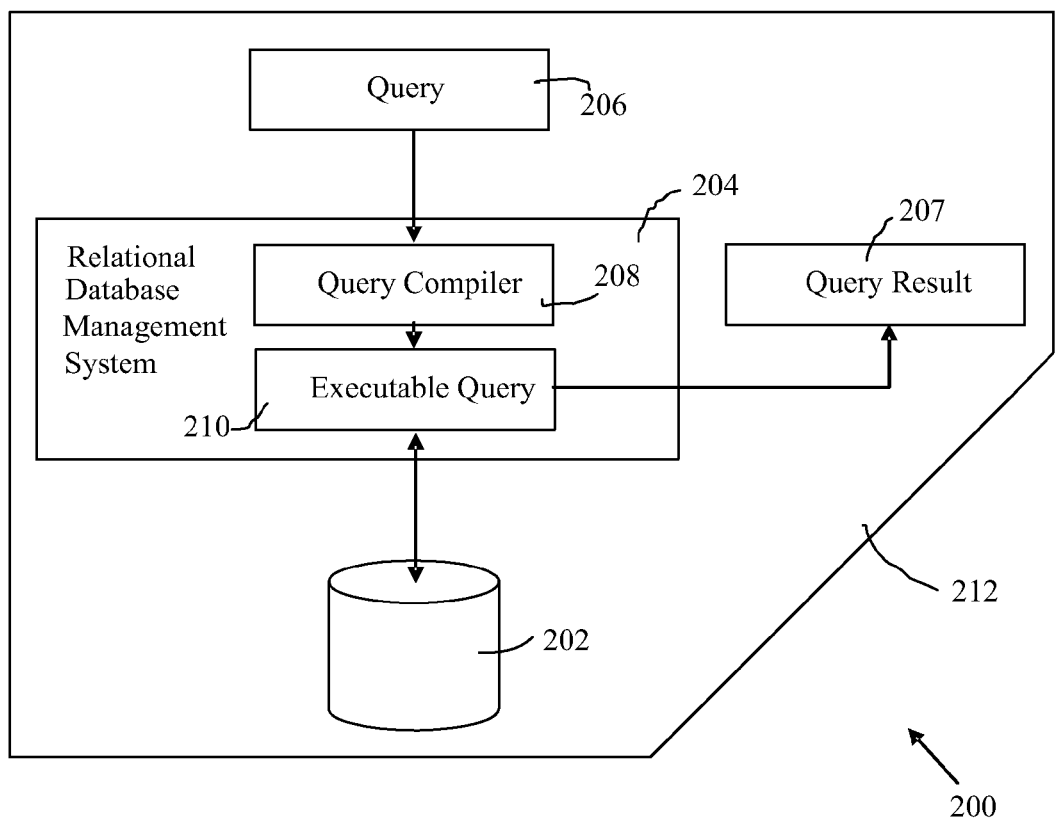

Referring to FIG. 2, there is depicted a data processing system 200 comprising a memory 212 for storing a database 202, a relational database management system (DBMS) 204, a query 206 and a query result 207. The DBMS 204 further comprises a query compiler 208 for reading the query 206 and subsequently generating an executable query 210. Output of the executable query 210 is the query result 207. An example of the query 206 is query (1), discussed in the Background of the Invention.

The DBMS 204 applies or executes the executable query 210 against data stored in the database 202. In query (1), the DBMS 204 applies the executable query 210 against the first and second tables T1 and T2 illustrated in FIG. 1.

Figure 3:
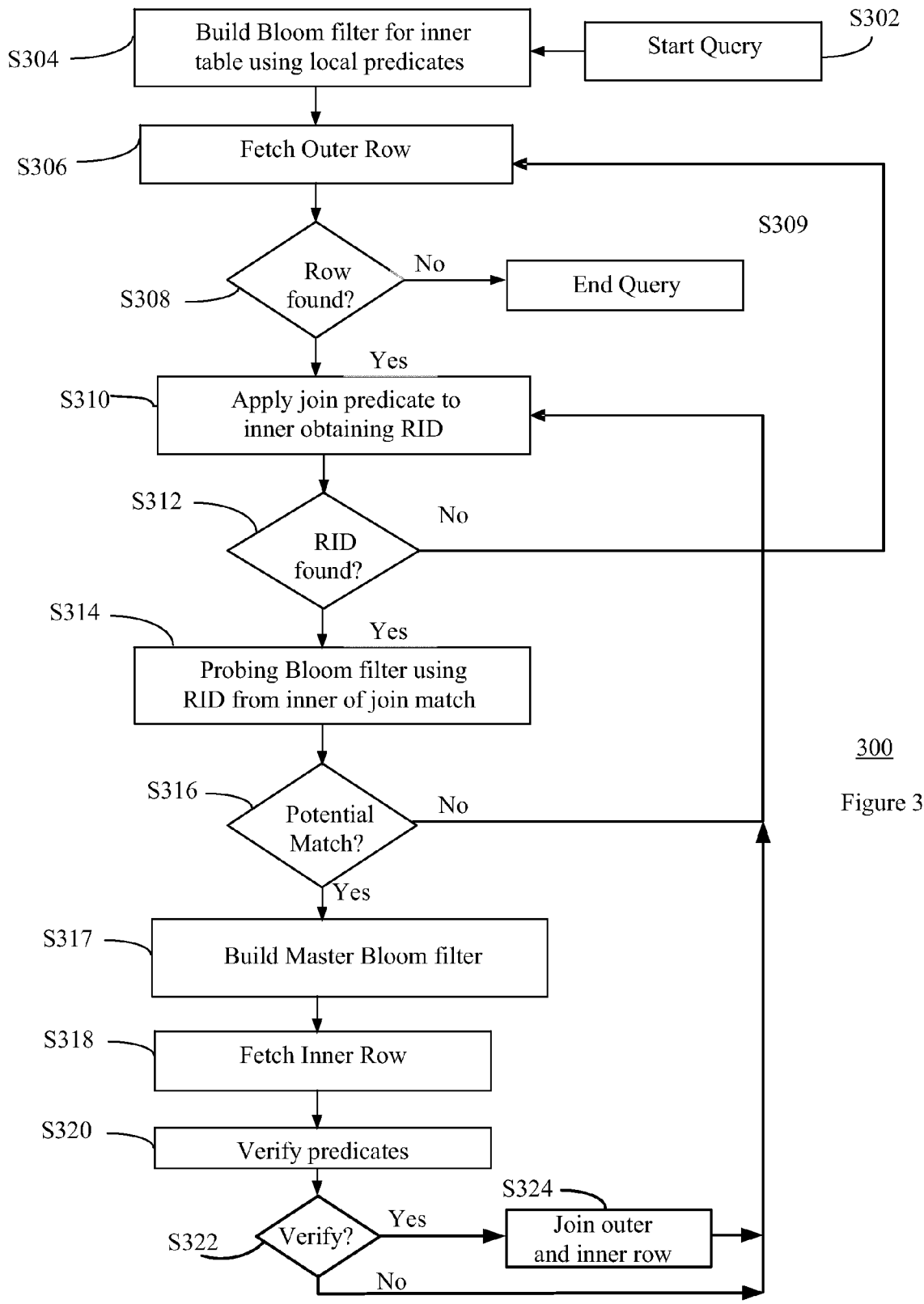
FIG. 3 is a process flow chart illustrating the operation of the query shown in FIG. 1a, in accordance with an embodiment of the present invention.

Referring now to FIG. 3, there is depicted a flow chart 300 representing general operation of an executable query 210 for achieving the above result in accordance with an embodiment of the present invention. The operation of the executable query 210 comprises several steps S302–S324.

Step S302 comprises starting the executable query 210. In the exemplary query (1), there are a plurality of fixed predicates, a conjunctive predicate and a join predicate. After the executable query 210 is started in step S302, step S304 comprises building a Bloom filter for applying local predicate filtering. Generally, a Bloom filter is a filter bit vector in which values to be filtered are hashed using one or more hash functions to set multiple bit positions in the filter bit vector. Given a Bloom filter and a value to be tested, the filter indicates that either the value may be present in the filter or that the value is definitely not present in the filter. A bit vector for each fixed predicate is built by scanning a corresponding index, if available. The bit vectors comprise a '1' for each row in the table indicating a possible match with the predicate and a '0' for each row in the table indicating a definite mismatch. A master Bloom filter vector is created for facilitating execution of the conjunctive predicate by logically combining the bit vectors for each fixed predicate in accordance with the conjunctive predicate.

Step S306 causes one row to be fetched from the outer table for joining with any rows from the inner table that are found to have matching join columns, as is be described in the following steps. In Step S308, a check is performed to determine if a row was obtained from the outer table. If no row was obtained, then the query 206 is complete (step S309). Otherwise, execution proceeds to step S310.

Step S310 comprises beginning to apply the join predicate of query (1) to the appropriate rows of the inner table. For each row in the outer table, all of the rows of the inner table are scanned. As previously described, the inner table generally has an index on the join column. Therefore, scanning of the inner table is relatively efficient, as the required value in the join column is simply looked up in the index. In step S312, if one or more matches are found for a given row, the RIDs for the matching rows are returned and the operation proceeds to step S314. Otherwise, the join proceeds to step S306, obtaining the next row in the outer table.

Step S314 comprises using the RIDs returned from the index of the join column for probing the master Bloom filter. The Bloom filter is probed to determine if each RID matching the row of the outer table is present. In step 316, if the result of the probe is a '1', then the value may be present and the operation proceeds to step S318. If the result of the probe is a '0', then the value is definitely not present and the operation proceeds to step S310 to process the next RID from the inner table's join predicate match. These steps are repeated until all qualifying RIDs have been used to probe the Bloom filter.

As previously described, the Bloom filter results in a definite response only when determining the absence of a value, not the presence of a value. Therefore, step S318 causes the row from the inner table to be fetched. Consequently, all of the necessary columns are available to verify that the row qualifies all predicates. Step 320 comprises verifying the result of the probe for the given RID from step S314. Thus, the predicates are applied to the row represented by the RID to verify that the row, in fact, does satisfy the query 206. In step S322, if the row is a valid match, it is joined with the row from the outer table in step SS324 and returned as a row in the output table. In either case, if the row does not qualify the predicates, or if the row is returned as a row in the output table, the operation proceeds to step S310, where the next RID is obtained for the inner table and the operation proceeds as described above.

Details of the operation of an executable query 210 in accordance with the present embodiment, query (1), and the tables illustrated in FIG. 1a, may now be described with reference to FIG. 3. As described with reference to the prior art, the join performed is a NLJN, where table T1 is the outer table and table T2 is the inner table.

Step S302 starts the executable query 210.

Step S304 comprises building a Bloom filter for applying local predicate filtering. In the present example, the local, fixed predicates of query (1) are 'T2.D2=7' and 'T2.D3=9'. For the first fixed predicate 'T2.D2=7', the index T2.idx.D2 of table T2 is accessed. Since the index T2.idx.D2 is organized in accordance with the value of D2, the predicate can be evaluated relatively quickly. A first bit vector is built for the first fixed predicate. If the predicate is true for a given RID then an associated bit, determined in by hashing the RID, is set to '1', otherwise it is set to '0'.

For the second fixed predicate 'T2.D3=9' of query (1), the index T2.idx.D3 of table T2 is accessed. Since the index T2.idx.D3 is organized in accordance with the value of D3, the predicate can be evaluated relatively quickly. As each RID is read from the index and hashed, a corresponding bit is combined with the first bit vector. That is, if the row associated with the RID satisfies the second predicate and the corresponding bit in the bit vector generated with the first predicate is a '1', then the two bits are effectively ANDed together. The corresponding bit in the new bit vector associated with the second predicate is set to a '1'. If the row from the second predicate associated with the RID does not satisfy the predicate, then a '0' is effectively ANDed with a corresponding bit in the bit vector generated using the first predicate by not setting a bit in the bit vector associated with the second predicate. Similarly, if the row from the second predicate associated with the RID does satisfy the predicate but the corresponding bit in the bit vector generated using the first predicate is a '0', then again, the two bits are effectively ANDed together by not setting a bit in the bit vector associated with the second predicate. The resulting bit vector is a master bit vector representing the conjunctive predicate 'T2.D2=7 AND T2.D3=9 '.

Step S306 comprises fetching the first row R1 from table T1. Step S308 determines if a row was fetched from table T1. Since a row was fetched, the operation proceeds to step S310, which comprises starting to apply the join predicate, 'T1.C1=T2.D1'. The value of C1 in the first row R1 of table T1 is '7'. Analyzing index T2.idx.D1 reveals that RIDs 1, 3, and 7 each have a value of '7' in column D1. Step S312 determines that a RID qualified the join predicate. Accordingly, in step S314, the Bloom filter is probed with RID 1. Since D2≠7, the probe may likely return a '0', causing the operation to proceed through step S316 back to step S310 where the next RID is retrieved and used for probing the Bloom filter in step S314. The next RID, RID 3, also likely returns a '0' since neither D2≠7 nor D3≠9. The next RID, RID 7, returns a '1' since both D2=7 and D3=9. Consequently, the operation proceeds to step S318.

In step 318, the inner row is fetched from the table. In step S320, the predicates are applied to the row represented by RID 7. Since D1=7, D2=7, and D3=9, the predicate is verified causing step S322 to continue the operation to step S324 where the row represented by RID 7 is joined with the first row R1 in table T1 providing a first output row S1 in output table TO. The operation continues to step S310. In step S312, it is then determined that RID 7 is the last RID for rows P1, P2, P3, P4, P5, P6, P7, P8 in the inner table T2 matching the first row R1 in the outer table T1. Accordingly, the join proceeds to step S306, where the next row, R2, in the outer table T1 is fetched.

The value of C1 in the second row R2 of table T1 is '3'. Analyzing index T2.idx.D1 reveals that RIDs 5 and 6 each have a value of '3' in column D1. Accordingly, in step S314, the Bloom filter is probed with RID 5. Since D2≠7, the probe may likely return a '0' and the next RID is used for probing the Bloom filter. The next RID, RID 6, returns a '1' since both D2=7 and D3=9. As a result, the operation proceeds to step S318.

Step 318 applies the predicates to the row represented by RID 6. Since D1=3, D2=7 and D3=9, the predicate is verified and the row represented by RID 6 is joined with the second row R2 in table T1 providing a second output row S2 in output table TO. The operation then returns to step S310 and step S312, where it is determined that RID 6 is the last RID for rows P1, P2, P3, P4, P5, P6, P7, P8 in the inner table T2 matching the second row R2 in the outer table T1. Accordingly, the join proceeds to the next row in the outer table T1 and returns to step S306. The operation continues until all rows R1, R2, R3, R4, R5, R6 in the outer table T1 have been processed, the result of which is shown in FIG. 1c.

Accordingly, the present invention provides considerable performance gains on the prior art by reusing the Bloom filter built from local predicates, without requiring covering indices on the combination of join and local predicated columns. Although the present embodiment is described with reference to the use of a Bloom filter, it may be apparent to a person skilled in the art that other filtering techniques for implementing index ANDing may be applied for achieving the desired result.

In an alternate embodiment, the NLJN is an outer join. An outer join causes all rows from the outer to be preserved, even if they do not find a match on the inner table. In this embodiment, steps S316 and S322 both return the outer row padded with NULLs to provide a row for the output table.

In yet an alternate embodiment, the inner rows are fetched and the predicates verified after the join has been completed. In this embodiment, step S324 precedes steps S318, and a new step is added to discard rows that fail the verification steps S320 and S322.

In yet an alternate embodiment, instead of using a filtered index for performing a join, as described in the previous embodiments, an unfiltered index is used for providing the table in a sorted order. A query plan is provided for sorting and applying local predicates to a table and joining the table to another table. However, it is expensive to sort the entire table and then apply the predicates for filtering the table as required. Therefore, if an index is available that provides a useful sorting order, or a desirable level of clustering, as determined by an optimizer, it is possible to exploit index ANDing for filtering the table and avoiding excessive fetching for executing the query.

"The present embodiment begins in a manner similar to the previous embodiment with steps S302–S316. However, at step S317 that follows step S316, a new Bloom filter is built, setting only bits that represent potential match rows from the inner table. Once all outer rows have been processed, the new Bloom filter is designated as the master Bloom filter. The index that provides the useful order is then used to probe the new master Bloom filter. As in the previous embodiment, steps S318–S322 are performed for each RID in the index that corresponds to '1' in the master Bloom filter and the predicates are applied to verify the result. If the result is verified, the row is returned. If a RID corresponds to a '0' in the Bloom filter, the row does not satisfy the predicate and the next RID is analyzed. Since the Bloom filter is probed in the order of the index, the output is provided in the order of the index, thus providing an output having a useful order while avoiding excessive fetching from the inner table."

In yet another alternate embodiment, a semijoin is used for combining tables where a first table has an index with a useful order but no local predicates and a second table has local predicates and a join predicate to the table with the useful order. As described in the previous embodiment, a filtering table is constructed for filtering the second table. A semijoin is used for populating a Bloom filter with the filtering table. The index on the first table that has the useful order is then used to probe the Bloom filter and provide the order desired.

One skilled in the art may appreciate that all references above to the execution of a single query can be considered in the context of execution of a single join within the context of a larger query comprising many joins. Output rows from this join methodology would be processed by addition joins that may or may not use the methods described herein.

Though the above embodiments are described primarily with reference to a method aspect of the invention, the invention may be embodied in alternate forms. In an alternative aspect, there is provided a computer program product having a computer-readable medium tangibly embodying computer executable instructions for directing a data processing system to implement any method, query compiler, or executable query as previously described above. It may be appreciated that the computer program product may be a floppy disk, hard disk or other medium for long term storage of the computer executable instructions.

In yet an alternative aspect, there is provided an article having a computer-readable signal-bearing medium, and having means in the medium for directing a data processing system to implement any method, query compiler, or executable query as previously described above. It may be appreciated that a supplier of the compiler may upload the article to a network (such as the Internet) and users may download the article via the network to their respective data processing systems.

It may be appreciated that variations of some elements are possible to adapt the invention for specific conditions or functions. The concepts of the present invention can be further extended to a variety of other applications that are clearly within the scope of this invention.

It is to be understood that the specific embodiments of the invention that have been described are merely illustrative of certain application of the principle of the present invention. Numerous modifications may be made to an information retrieval system and method using index ANDing for improving performance invention described herein without departing from the spirit and scope of the present invention.

What is claimed is:

1. A processor-implemented information retrieval method for processing a query having an associated plan, the associated plan comprises applying predicates, comprising local predicates and a join predicate, to at least two tables, the method comprising:

using index ANDing to construct a master filter for filtering a first table in accordance with the local predicates;

iteratively fetching a row from a second table;

iteratively applying the join predicate to the first table using values from the fetched row from the second table for determining row identifiers of rows in the first table satisfying the join predicate;

using the row identifiers to probe the master filter for determining whether the rows satisfying the join predicate also satisfy the local predicates;

fetching the rows from the first table that satisfy both the join and local predicates resulting from the probing of the master filter;

completing the join predicate of the rows fetched from the first of the table; and returning results of the join predicate by combining the rows fetched from the first table with the rows fetched from the second table.

2. The method of claim 1, wherein the use of the row identifiers to probe the filter for determining whether the rows satisfying the join predicate satisfy the local predicates before fetching the rows reduces excessive fetching for achieving a desired output.

3. The method of claim 1, wherein the filter is a Bloom filter.

4. The method of claim 3, further comprising applying the predicates to each row that satisfies both the join predicate and the local predicates for verification before returning the results.

5. The method of claim 4, wherein the join predicate uses a nested loop join.

6. The method of claim 5, wherein the join is an outer join and all rows on an outer table are preserved even if a match on a corresponding inner table is not found.

7. The method of claim 4, wherein applying the predicates to each row that satisfies both the join predicate and the local predicates for verification is performed before completing the join predicate.

8. The method of claim 4, wherein applying the predicates to each row that satisfies both the join predicate and the local predicates for verification is performed after completing the join predicate.

9. The method of claim 1, wherein the index with the sorting order provides clustering of rows according to a request by an optimizer.

10. A processor-implemented information retrieval system adapted to process a query having an associated plan, the associated plan comprises applying predicates that comprise local predicates and a join predicate, to at least two tables, the information retrieval system comprising:

means for using index ANDing to construct a master filter for filtering a first table in accordance with the local predicates;

means for iteratively fetching a row from a second table;

means for iteratively applying the join predicate to the first table using values from the fetched row from the second table for determining row identifiers of rows in the first table satisfying the join predicate;

means for using the row identifiers to probe the master filter for determining whether the rows satisfying the join predicate also satisfy the local predicates;

means for fetching the rows from the first table that satisfy both the join and local predicates resulting from the probing of the master filter;

means for completing the join predicate of the rows fetched from the first of the table; and means for returning results of the join predicate predicate by combining the rows fetched from the first table with the rows fetched from the second table.

11. The information retrieval system of claim 10, wherein the means for using the row identifiers to probe the filter for determining whether the rows satisfying the join predicate satisfy the local predicates before fetching the rows reduces excessive fetching for achieving a desired output.

12. The information retrieval system of claim 10, wherein the filter is a Bloom filter.

13. The information retrieval system of claim 12, further comprising means for applying the predicates to each row that satisfies both the join predicate and the local predicates for verification.

14. The information retrieval system of claim 13, wherein the join predicate uses a nested loop join.

15. The information retrieval system of claim 14, wherein the join predicates uses an outer join and all rows on an outer table are preserved even if a match on a corresponding inner table is not found.

16. The information retrieval system of claim 13, wherein the means for applying the predicates to each row that satisfies both the join predicate and the local predicates for verification applies the predicates before the join predicate is completed.

17. The information retrieval system of claim 13, wherein the means for applying the predicates to each row that satisfies both the join predicate and the local predicates for verification applies the predicates after the join predicate is completed.

18. The information retrieval system of claim 10, wherein the index with the sorting order provides clustering of rows as requested by an optimizer.

19. A computer program product having executable instruction codes stored on a computer-usable medium for directing an information retrieval system to apply predicates, the information retrieval system processing a query having an associated plan, and the associated plan comprises applying predicates that comprises local predicates and a join predicate, to at least two tables, the computer program product comprising:

a set of instruction codes for using index ANDing to construct a master filter for filtering a first table in accordance with the local predicates;

a set of instruction codes for iteratively fetching a row from a second table;

a set of instruction codes for iteratively applying the join predicate to the first table using values from the fetched row from the second table for determining row identifiers of rows in the first table satisfying the join predicate;

a set of instruction codes for using the row identifiers to probe the master filter for determining whether the rows satisfying the join predicate also satisfy the local predicates;

a set of instruction codes for fetching the rows from the first table that satisfy both the join and local predicates resulting from the probing of the master filter;

a set of instruction codes for completing the join predicate of the rows fetched from the first of the table; and a set of instruction codes for returning results of the join predicate by combining the rows fetched from the first table with the rows fetched from the second table.

20. The computer program product of claim 19, wherein the set of instruction codes for using the row identifiers to probe the filter, satisfies the local predicates before fetching the rows reduces excessive fetching for achieving a desired output.

21. The computer program product of claim 19, wherein the filter is a Bloom filter.

22. The computer program product of claim 21, further comprising a set of instruction codes for applying the predicates to each row that satisfies both the join predicate and the local predicates for verification.

23. The computer program product of claim 22, wherein the join predicate uses a nested loop join.

24. The computer program product of claim 23, wherein the join predicates uses an outer join and all rows on an outer table are preserved even if a match on a corresponding inner table is not found.

25. The computer program product of claim 22, wherein the set of instruction code for applying the predicates to each row that satisfies both the join predicate and the local predicates, applies the predicates to each row that satisfies both the join predicate and the local predicates for verification before the join predicate is completed.

26. The computer program product of claim 22, wherein the set of instruction code for applying the predicates to each row that satisfies both the join predicate and the local predicates, applies the predicates to each row that satisfies both the join predicate and the local predicates for verification after the join predicate is completed.

27. The computer program product of claim 19, wherein the index with the sorting order provides clustering of rows as requested by an optimizer.

* * * * *